March 27, 1956    R. A. AMMON    2,740,093
METER TESTER
Filed April 15, 1953
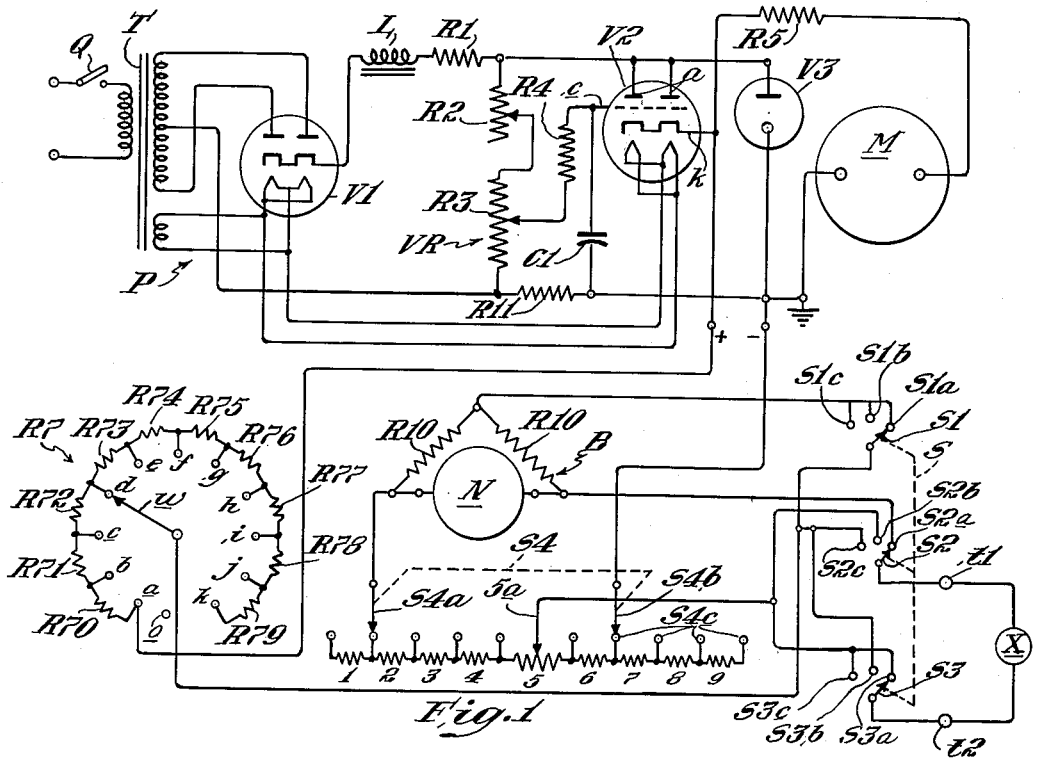
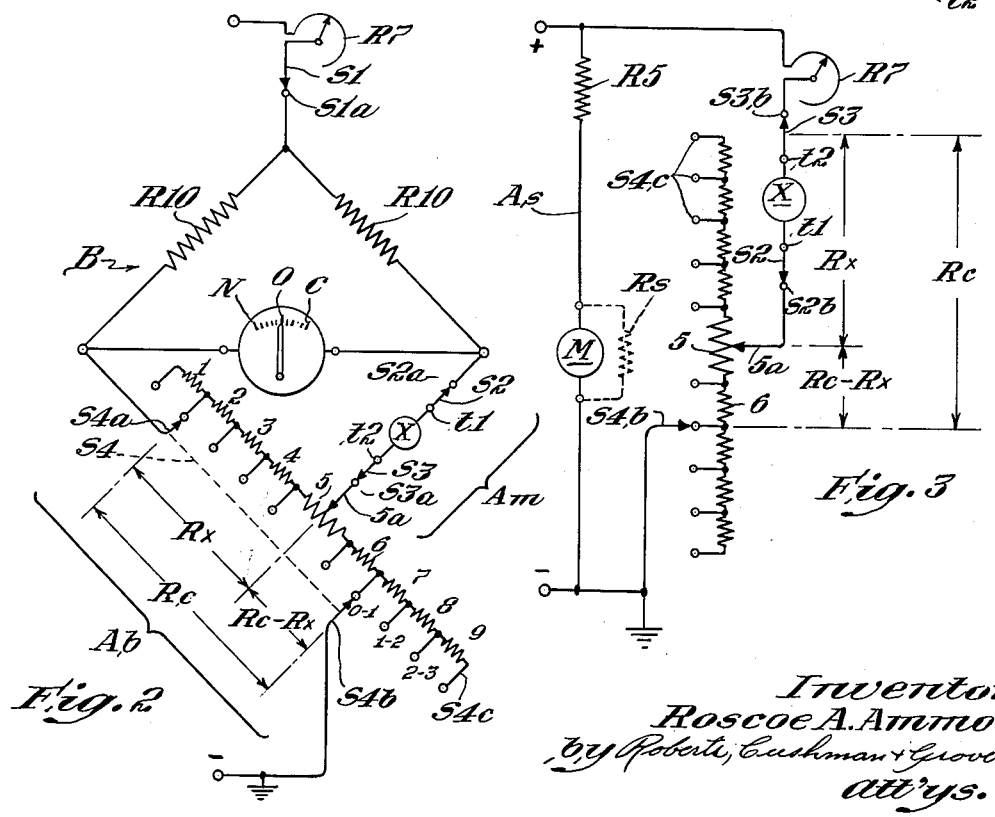
Inventor
Roscoe A. Ammon
by Roberts, Cushman & Grover
att'ys.

United States Patent Office 2,740,093
Patented Mar. 27, 1956

2,740,093

METER TESTER

Roscoe A. Ammon, Manchester, N. H., assignor to Marion Electrical Instrument Co., Manchester, N. H., a corporation of New Hampshire Application April 15, 1953, Serial No. 348,990

8 Claims. (Cl. 324—74)

This application relates to meter testing apparatus for determining the current sensitivity and internal resistance of direct current instruments such as voltmeters and ammeters.

One way of measuring the current sensitivity of a meter is by comparison with a standard, highly accurate meter. Previous testers, however, have not attained the high degree of precision now desired because the unknown resistance of the meter under test is a factor in the comparison with a standard meter, and hence a deviation of the unknown resistance from normal or rated resistance will introduce inaccuracy in the current sensitivity measurement. Accordingly, one object of the present invention is to compensate for such deviations and afford a measurement of higher precision than hitherto has been possible.

Precise measurement of the internal resistance of a meter may be made on a conventional Wheatstone bridge, subject however to the danger that during the balancing adjustment of the bridge an overload or excess of current above the full scale rating or capacity of the meter may damage its movement. Thus another object of this invention is to provide apparatus which prevents overloading the meter under test.

Further objects are to provide testing apparatus which is simple and compact, which is easily and efficiently operated and which is economically manufactured.

In one aspect the apparatus comprises a bridge, for example a four-arm Wheatstone bridge, one arm having terminals for connection to the meter under test and another arm, which may be termed a balancing arm, having a balancing resistance and a tap for the balancing resistance connected to one of the meter terminals. The tap is adjustable to divide the resistance into a balancing portion equal to the unknown meter resistance, thereby to balance the bridge, and into a compensating portion equal to the total of the balancing resistance minus the unnkown resistance of the meter. The apparatus further comprises a standard meter circuit for measuring the sensitivity of said unknown meter and switch means for connecting the unkown meter and the compensating portion in series with each other and in parallel with the aforesaid circuit, whereby after said balancing adjustment a predetermined resistance is transferred in parallel with the standard meter circuit regardless of the resistance of the unknown meter. As suggested above when any possible deviation of the resistance of the unkown meter from normal is compensated the current sensitivity measurement can be made with the highest precision. Preferably the switch means electrically disconnects the unknown meter and the compensating portion from the bridge and transfers the same in parallel with the standard meter. More particularly the balancing resistance comprises a balancing resistor and a pair of ganged taps contacting the balancing resistor at points straddling the aforesaid single tap and connected to opposite ends of the balancing arm thereby to include a constant or predetermined resistance, the balancing resistance, in said balancing arm. The ganged taps are movable in unison to adjust the resistance of the aforesaid balancing portion so that it is substantially equal to the unknown resistance of the meter under test, without varying the predetermined total of the balancing resistance included in the balancing arm.

In a further aspect a variable resistance is provided which is connectable in series with the unknown meter across the aforesaid power source, the variable resistance being adjustable to limit the current through the unknown meter to a value within the capacity or full scale deflection rating of the meter, and the aforesaid switch means including means for connecting the current limiting variable resistance in series with the bridge thereby to prevent overloading of the meter under test while one or more of the aforesaid taps are adjusted to balance the bridge. In a specific aspect the variable resistance comprises a series of resistance increments added stepwise, the increasing sum of the increments corresponding to the current capacity of meters of increasing sensitivity and the total of said sum plus the aforesaid constant resistance of the balance arm varying inversely as the increasing sensitivities of the meters.

For the purpose of illustration a typical embodiment of the invention is shown in the accompanying drawing in which Fig. 1 is a circuit diagram of the meter testing apparatus;

Fig. 2 is a schematic diagram showing the resistance measurement portions of the circuit; and Fig. 3 is a similar diagram showing the sensitivity measuring portion of the circuit.

The meter testing circuit shown in Fig. 1 comprises a power supply P, a voltage regulating and control circuit VR, a standard meter M, a variable range selector resistor R7, a Wheatstone bridge B including a null galvanometer N, and a ganged switch S having contactors S1, S2 and S3. The meter X to be tested for internal resistance and current sensitivity is connected to the circuit at terminals $t1$, $t2$.

The power supply P includes an "on-off" switch Q, a power transformer T and a full wave rectifier V1 connected conventionally. A choke coil L and resistors R1 and R11 act as A. C. filtering elements.

The output of the power supply is maintained at a constant potential of approximately 150 volts by a voltage regulator tube V3 which may be type VR150. This potential is applied to the anodes $a$ of a voltage control tube V2, and is also applied across a pair of voltage dividing resistors including a calibration control R3 and a vernier control R2. The adjustable tap of calibration control resistor R3 is connected to the control grids $c$ of the control tube V2. Variation of resistor R3 provides a coarse adjustment of the potential drop between the cathodes $k$ of the control tube and its anodes, these electrodes being connected respectively to the ($+$) and ($-$) terminals of the power supply and voltage regulation circuit. The voltage divider resistor R2 provides a vernier adjustment of this output potential.

The standard meter M is a very precise galvanometer having a full scale deflection sensitivity, for example, of 8 milliamperes. The standard meter in series with a resistance R5 is connected across the regulated power source terminals plus ($+$) and minus ($-$). The resistance R5 is selected or adjusted for a full scale deflection at a convenient potential such as one hundred volts. As will be explained more fully hereinafter, the standard meter during the sensitivity measurement is connected in parallel with the unknown meter X and in series with a variable range selector resistance R7 which is adjusted so as to maintain the proper relation between the current through the standard meter and the current through the meter X under test.

As shown in Figs. 1 and 2 the Wheatstone bridge B comprises two arms having equal resistances R10, a meter arm A$m$, a fourth arm A$b$ and the null galvanometer N which has a null mark O and calibration marks C. Associated with the fourth arm is a series of resistors 1 to 9 inclusive at the end of each resistor is a terminal S4$c$. A ganged switch S4 including taps S4$a$ and S4$b$ is arranged to contact two of the terminals S4$c$ and thereby include a constant resistance, designated R$c$, in the fourth arm A$b$. The two contactors of switch S4 are mechanically connected as indicated by the broken line so that exactly five of the resistors 1 to 9 are always included in the balancing arm. These resistors are all of the same value, for example, 1,000 ohms each. The center resistor 5 is a highly accurate, calibrated potentiometer of the type known by the trademark Helipot. A variable tap 5$a$ for the potentiometer is connected, during the resistance measurement to one of the meter terminals $t$2. Balancing of the bridge is accomplished by adjustment of the ganged contactors S4$a$ and S4$b$ and the potentiometer tap 5$a$. When the bridge is balanced as indicated by a zero reading on the null galvanometer N, the resistance value between tap 5$a$ and tap S4$a$ will be equal to the unknown resistance of the meter S under test. This resistance may be read by adding the reading of the potentiometer to the resistance between the potentiometer and the tap or contactor S4$a$, which latter readings may be indicated by the mechanism S4 which moves the contactors S4$a$ and S4$b$.

According to the present invention adjustment of the taps S4$a$ and S4$b$ or 5$a$ divides the constant resistance R$c$ between the ganged taps into the balancing portion designated R$x$ and a compensating portion, between the potentiometer tap S3$a$ and the ganged tap S4$b$, this compensating portion being designated in Fig. 2 as R$c$—R$x$.

The conventional three-pole, three position ganged switch S shown in the lower right-hand corner of Fig. 1 comprises three contactors S1, S2 and S3 each of which has three positions and corresponding contacts $a$, $b$ and $c$. In position $a$ (as shown in Fig. 1) the upper contactor S1 completes a connection from the variable resistor R7 through contact S1$a$ to the fixed arms R10 of the bridge B; contactors S2 and S3 complete a circuit from the meter terminals $t$1 and $t$2 to opposite ends of the meter arm A$m$. Thus when this ganged switch S is in the position shown in Fig. 1 the meter X under test is connected for the resistance measurement.

In the second position $b$ the upper contactor S1 disconnects the variable resistor R7 from the bridge and contactors S2 and S3 connect the variable resistor R7, the meter X and the compensating portion (R$c$—R$x$) of the balancing resistance R$c$ in series with each other and in parallel with the standard arm as previously described. The circuit completed in this position of the ganged switch S is illustrated in Fig. 3 and places the circuits in condition for the sensitivity measurement.

The third position $c$ of the ganged switch S, not shown in Fig. 1 or Fig. 3, merely reverses the electrical position of the meter terminals $t$1 and $t$2 in the sensitivity measuring circuit. This position is used if the meter has not been connected to the meter terminals in the normal polarity or to reverse the direction of deflection.

The variable resistor R7 may be omitted from the present circuit if only meters in one internal resistance range are to be tested although their internal resistance may vary somewhat within the selected range. If for convenience the variable resistor R7 is included to limit current through the unknown meter by increasing the resistance of the circuit in which the unknown meter is connected, it is then necessary to relate the adjust value of R7 to the constant value R$c$ as well as to the assumed range of internal resistance of the unknown meter, which values are described more fully hereinafter.

With reference to Fig. 3 it will be seen that regardless of what the internal resistance of the meter under test X may be any deviation of this unknown resistance from its rated internal resistance is compensated for by adding to the internal resistance of the meter X the compensating portion (R$c$—R$x$) of the balancing resistance so that the total resistance placed in series with the variable resistor R7 is of a predetermined constant value, namely R$c$.

The variable resistance R7 comprises a series of resistance increments R70 to R79 with contacts $a$ to $k$ inclusive corresponding to various meter sensitivities, an off contact $o$, and a wiper $w$.

Suitable values for the increments of the variable resistor R7 are as follows: R70, 5,000 ohms; R71, 10,000 ohms; R72, 80,000 ohms; R73, 25,000 ohms; R74, 75,000 ohms; R75, 50,000 ohms; R76, 250,000 ohms; R77, 500,000 ohms, R78, 1 megohm and R79, 2 megohms. The corresponding increasing meter sensitivities which the apparatus is adapted to measure are, with reference to the contacts $b$ to $k$: $b$, 0–10 milliamperes; $c$, 0–5 milliamperes; $f$, 0–1 milliamperes; $d$, 0–800 microamperes; $e$, 0–500 microamperes; $g$, 0–400 microamperes; $h$, 0–200 microamperes; $i$, 0–100 microamperes; $j$, 0–50 microamperes; $k$, 0–25 microamperes. When the wiper $w$ is at contact $a$ the apparatus will test voltage sensitivity in the 0–100 volt range.

According to a further aspect of the present invention the individual values of increments R70 to R79 are selected with relation to the constant resistance R$c$ such that the sum of one or more of the increments when added to the constant resistance R$c$ varies inversely as the current sensitivities of the various meters which the apparatus is adapted to test. By the sum of the increments is meant the total resistance added stepwise in series with the meter X when the wiper $w$ of the variable resistance R7 is rotated clockwise from one of the contacts $a$ to $k$ inclusive to another. For example, if a 10 milliampere meter is to be tested, the wiper $w$ is rotated to contact $b$ thereby placing the resistance R70 of 5,000 ohms in series with the constant resistance R$c$ of 5,000, thus establishing a relation of 10,000 ohms to 0.01 ampere. If a 5 milliampere meter is to be tested the variable resistance wiper $w$ is set at contact $c$ thus placing the sum of R70, 5,000 ohms, plus the resistance of R71, 10,000 ohms, in series with the constant resistance R$c$ of 5,000 ohms, thus establishing the relation of 20,000 ohms to 0.005 ampere, from which relation it can be seen that with reference to the previous relation the sum of the resistance increments plus the constant resistance varies inversely as the increasing sensitivity of the meter.

It will be understood, of course, that these values are given by way of example only and that other values for the increments of R7 and R$c$ may be chosen to establish the proper relation between sensitivity and resistance.

Preparatory to testing an unknown meter, the wiper $w$ of the variable resistance R7 is turned to the off contact $o$; the voltage dividing resistors R2 and R3 of the power supply, are set at mid-scale; the triple ganged switch S is set at position $b$ or $c$; and the meter is connected to the terminals $t$1 and $t$2. The balancing resistance taps S4$a$ and S4$b$, and the tap 5$a$ of the potentiometer 5 may if desired be roughly adjusted according to the rated internal resistance of the meter X, although this is not necessary. The wiper $w$ of the variable resistance is then rotated stepwise to the position corresponding to the sensitivity of the meter under test, or, if this is not known, until both the standard meter M and the unknown meter X can be advanced to full scale deflection with the calibration control R3. It is then assured that resistance of the variable resistance R7, the meter X and the roughly adjusted compensating portion 6 will limit the current through the meter to a value within the capacity of the meter because the ratio of the resistance in the unknown meter circuit and that in the standard meter circuit results in a division of current through the two circuits such that each current is close to the full scale or safe value. If on first advancing the wiper w of the variable resistance R7 the meter under test shows a negative deflection, the switch S is transferred between the middle position b and the extreme left position c.

After the variable resistance R7 is adjusted to produce full scale deflection of the meter X the ganged switch S is transferred to its extreme right position a. The electrical location of the variable resistance R7, the meter under test X and the balancing resistance Rc minus Rx is thereby transferred from the location shown in Fig. 3 to that shown in Fig. 2. It will be noted that the variable resistance R7 and the balancing resistance Rc minus Rx continue to limit the current through the meter under test X to a value at least as low as that proved to have been safe in the above described preliminary adjustment. Any adjustment of the ganged taps S4a and S4b and the potentiometer tap 5a will now be insufficient to alter this resistance so as to permit current between the terminals (+) and (—) which will overload the meter X.

The internal resistance of the meter X is now determined with the ganged switch S in position a as shown in Fig. 1 by balancing the bridge and observing the null galvanometer N as described above. The precision of the potentiometer 5 and the series of resistors 1 to 9 inclusive permits the direct reading of the internal resistance of the meter X, although this reading need not be taken if only the sensitivity of the meter is to be measured.

For the precise sensitivity measurement the switch S is returned to the position b or c in which a positive, full scale deflection was obtained. Potentiometers R3 and R2 are then successively adjusted until the meter X is exactly at full scale deflection or at some convenient fraction of full scale deflection. The difference between the reading of the meter under test X and the reading of the precision standard M indicates the deviation from normal or the error in the calibration of the sensitivity of the meter X. Preferably the standard meter is calibrated so as to indicate the sensitivity of the meter being tested in per cent of full scale range. For instance if a one milliampere meter reads one milliampere and the standard meter reads 98%, the meter being tested actually has a 0.98 milliampere sensitivity and is indicating 2% high at the one millampere point.

Having first set the variable resistance R7 to limit the current through the meter X, the circuit shown in Fig. 2 may be also used as a limit bridge. For this purpose the null galvanometer is calibrated at either side of its null position O with calibration marks C indicating the deviation of actual internal resistance of the meter being tested from its rated internal resistance. For this use the ganged contactors S4a and S4b and the precise potentiometer 5 are set at the rated internal resistance of the meter or meters to be tested. A large number of meters of the same supposed internal resistance may then be quickly connected in succession to the meter terminals t1 and t2 and the deflection of the null galvanometer noted. Preferably the null galvanometer is calibrated in percentage of error. Since good practice rarely tolerates over 3% error the null galvanometer need have four or five per cent of calibration on either side of its null position O.

From the foregoing it is apparent that the present invention affords a new high precision sensitivity measuring circuit by accurate compensation for deviation in the internal resistance of the meter under the compensating adjustment. The instrument embodying the present invention is convenient and flexible in use, highly reliable in operation yet simple in construction.

It should be understood that the present disclosure is for the purpose of illustration only and that this invention includes all modifications and equivalents which fall within the scope of the appended claims.

I claim:

1. For determining precisely the sensitivity of a meter of unknown resistance, electrical apparatus comprising power terminals, a Wheatstone bridge connected between said terminals and including a meter arm having terminals for connection to the meter under test and a fourth arm including in part a balancing resistance, a tap for said balancing resistance connected to one of said meter terminals, said tap being adjustable to divide said resistance into a balancing portion equal to the meter resistance thereby to balance the bridge, and a compensating portion equal to the balancing resistance minus the unknown resistance of the meter, a standard meter circuit connected between said power terminals for measuring the sensitivity of said unknown meter, and switch means for disconnecting the unknown meter and said compensating portion from the bridge and connecting the same in series with each other and in parallel with said circuit, whereby a predetermined resistance is transferred in parallel with the standard meter circuit regardless of the resistance of the unknown meter.

2. For determining precisely the sensitivity of a meter of unknown resistance, electrical apparatus comprising power terminals, a Wheatstone bridge connected between said terminals and including a meter arm having terminals for connection to the meter under test and a fourth arm including in part a balancing resistance, a tap for said balancing resistance connected to one of said meter terminals, said tap being adjustable to divide said resistance into a balancing portion equal to the meter resistance thereby to balance the bridge, and a compensating portion equal to the balancing resistance minus the unknown resistance of the meter, a standard meter connected between said power terminals for measuring the sensitivity of said unknown meter, and switch means for electrically disconnecting the unknown meter and said compensating portion from said bridge and connecting the same in parallel with said standard meter, whereby a predetermined resistance is transferred in parallel with the standard meter regardless of the resistance of the unknown meter.

3. For determining precisely the sensitivity of a meter of unknown resistance, electrical apparatus comprising a power source, a Wheatstone bridge across said source, said bridge including a meter arm having terminals for connection to the meter under test and a fourth arm including in part a balancing resistance, one end of said resistance being connected to one of said meter terminals, said tap being adjustable to divide said resistance into a balancing portion equal to the meter resistance thereby to balance the bridge, and a compensating portion between said power source and said tap, said compensating portion being equal to the balancing resistance minus the unknown resistance of the meter, a standard meter connected between said power terminals for measuring the sensitivity of said unknown meter, and switch means for disconnecting the unknown meter and said compensating portion from the bridge and connecting the same in series with each other and in parallel with said standard meter, whereby a predetermined resistance is transferred in parallel with the standard meter regardless of the resistance of the unknown meter.

4. For determining precisely the sensitivity of a meter of unknown resistance, electrical apparatus comprising power terminals, a Wheatstone bridge connected between said terminals and including a meter arm having terminals for connection to the meter under test and a fourth arm including in part a balancing resistance, a tap for said balancing resistance connected to one of said meter terminals, said tap dividing said resistance into a balancing portion and a compensating portion, said balancing resistance comprising a pair of ganged taps contacting the balancing resistor at points straddling the first said tap and connected to opposite ends of said balancing arm thereby to include a constant resistance in said balancing arm and said ganged taps being movable in unison to adjust the resistance of the aforesaid balancing portion so that it is substantially equal to the unknown resistance of the meter thereby to balance the bridge and adjust the compensating portion so that it is substantially equal to said constant minus the unknown resistance of the meter, a standard meter connected between said power terminals for measuring the sensitivity of said unknown meter, and switch means for disconnecting the unknown meter and said compensating portion from the bridge and connecting the same in series with each other and in parallel with said standard meter, whereby a predetermined resistance is transferred in parallel with the standard meter regardless of the resistance of the unknown meter.

5. For determining precisely the sensitivity of a meter of unknown resistance, electrical apparatus comprising power terminals, a Wheatstone bridge connected between said terminals and including a meter arm having terminals for connection to the meter under test and a fourth arm including in part a balancing resistance, a tap for said balancing resistance connected to one of said meter terminals, said tap dividing said resistance into a balancing portion and a compensating portion, said balancing resistance including a plurality of equally valued resistors in series, a contact at the end of each resistor, a pair of ganged contactors for contacting two of said contacts respectively, said contactors being respectively connected to opposite ends of said balancing arm to include a predetermined constant number less than the total number of resistors in said arm, and said ganged contactors being adjustable in unison to adjust the number of resistors in said balancing portion so that it is substantially equal in value to the unknown resistance of the meter thereby to balance the bridge and adjust the compensating position so that it is substantially equal to said constant number minus the unknown resistance of the meter, a standard meter connected between said power terminals for measuring the sensitivity of said unknown meter, and switch means for disconnecting the unknown meter and said compensating portion from the bridge and connecting the same in series with each other and in parallel with said standard meter, whereby a predetermined resistance is transferred in parallel with the standard meter regardless of the resistance of the unknown meter.

6. For determining precisely the sensitivity of a meter of unknown resistance, electrical apparatus comprising power terminals, a Wheatstone bridge connected between said terminals and including a meter arm having terminals for connection to the meter under test and a fourth arm including in part a balancing resistance, a tap for said balancing resistance connected to one of said meter terminals, said tap being adjustable to divide said resistance into a balancing portion equal to the meter resistance thereby to balance the bridge, and a compensating portion equal to the balancing resistance minus the unknown resistance of the meter, a standard meter connected between said power terminals for measuring the sensitivity of said unknown meter, and switch means for disconnecting the unknown meter and said compensating portion from the bridge and connecting the same in series with each other and in parallel with said standard meter, whereby a predetermined resistance is transferred in parallel with the standard meter regardless of the resistance of the unknown meter, a power source, and a variable resistance connectable in series with the unknown meter across the power source, said variable resistance being adjustable to limit the current through the unknown meter to a value within the capacity of the meter, the aforesaid swich means including means for connecting said current limiting variable resistance in series with the bridge, thereby to prevent overloading of the meter under test while said tap is adjusted to balance the bridge.

7. For determining precisely the sensitivity of a meter of unknown resistance, electrical apparatus comprising power terminals, a Wheatstone bridge connected between said terminals and including a meter arm having terminals for connection to the meter under test and a fourth arm including in part a balancing resistance, a tap for said balancing resistance connected to one of said meter terminals, said tap being adjustable to divide said resistance into a balancing portion equal to the meter resistance thereby to balance the bridge, and a compensating portion equal to the balancing resistance minus the unknown resistance of the meter, a standard meter connected between said power terminals for measuring the sensitivity of said unknown meter, and switch means for disconnecting the unknown meter and said compensating portion from the bridge and connecting the same in series with each other and in parallel with said standard meter, whereby a predetermined resistance is transferred in parallel with the standard meter regardless of the resistance of the unknown meter, a current source, and a variable resistance connectable in series with the unknown meter across the current source, said variable resistance being adjustable to limit the current through the unknown meter to a value within the capacity of the meter, and said variable resistance comprising a plurality of increments added stepwise in said series, the increasing sum of said increments corresponding to the current capacity of meters of increasing sensitivity and said series plus said constant resistance varying inversely as the increasing sensitivities of said meters, the aforesaid switch means including means for connecting said current limiting variable resistance in series with the bridge, thereby to prevent overloading of the meter under test while said tap is adjusted to balance the bridge.

8. In apparatus for measuring the current sensitivity of meters of different current capacities, the combination of a power source, a standard meter having a fixed resistance across said power source, a variable resistance and a compensating resistance in series with each other and in parallel with said standard, and terminals for connecting a meter of unknown resistance in series with said resistances, said compensating resistance being adjustable so that its resistance plus the unknown resistance of the meter is equal to a predetermined constant resistance, and said variable resistance comprising a plurality of increments added stepwise in said series, the increasing sum of said increments corresponding to the current capacity of meters of increasing sensitivity and said series plus said constant resistance varying inversely as the increasing sensitivities of said meters.

References Cited in the file of this patent

UNITED STATES PATENTS 2,189,660    Boudreau  ---------------- Feb. 6, 1940